United States Patent
Suzuki et al.

(10) Patent No.: US 8,812,208 B2
(45) Date of Patent: Aug. 19, 2014

(54) CONTROL APPARATUS FOR HYBRID VEHICLE

(75) Inventors: Masami Suzuki, Mishima (JP); Fumihiro Yamanaka, Hiratsuka (JP)

(73) Assignee: Jatco Ltd, Fuji-shi (JP)

( * ) Notice: Subject to any disclaimer, the term of this patent is extended or adjusted under 35 U.S.C. 154(b) by 363 days.

(21) Appl. No.: 13/361,627

(22) Filed: Jan. 30, 2012

(65) Prior Publication Data

US 2012/0202646 A1   Aug. 9, 2012

(30) Foreign Application Priority Data

Feb. 3, 2011   (JP) ................................ 2011-021673

(51) Int. Cl.
*B60W 10/02* (2006.01)

(52) U.S. Cl.
USPC ............................................................ 701/67

(58) Field of Classification Search
None
See application file for complete search history.

(56) References Cited

U.S. PATENT DOCUMENTS

| | | | |
|---|---|---|---|
| 7,314,428 B2 * | 1/2008 | Nakajima et al. | 477/118 |
| 7,749,132 B2 * | 7/2010 | Motosugi et al. | 477/5 |
| 7,878,281 B2 * | 2/2011 | Tanishima | 180/65.265 |
| 8,192,324 B2 * | 6/2012 | Kraska et al. | 477/5 |
| 8,663,062 B2 * | 3/2014 | Kawai et al. | 477/5 |

FOREIGN PATENT DOCUMENTS

JP   2009-214640 A   9/2009

* cited by examiner

*Primary Examiner* — Erin D Bishop
*Assistant Examiner* — Huan Le
(74) *Attorney, Agent, or Firm* — Foley & Lardner LLP

(57) ABSTRACT

A control apparatus of a hybrid vehicle provided with an engine, a motor, an automatic transmission performing a shift by engaging/disengaging a plurality of engagement elements, a first clutch arranged between the engine and the motor for transmitting/cutting a driving force between the engine and the motor and a second clutch arranged between the motor and driving wheels for transmitting/cutting a driving force from the motor to the driving wheels, has a slip control section that controls the second clutch to a slip state during the shift of the automatic transmission. In a case of a successive shift in which a current shift and a succeeding shift are successively performed, the slip control section gradually increases an engagement pressure of the second clutch when changing the slip state of the second clutch to a fully engaged state after the current shift is completed and before the succeeding shift is completed.

4 Claims, 7 Drawing Sheets

FIG.6
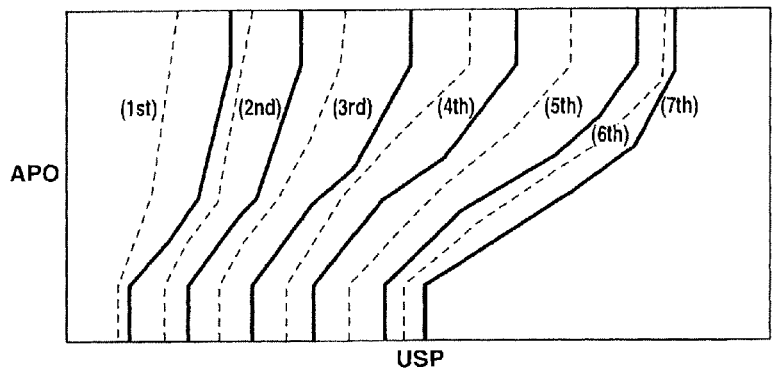
FIG.7
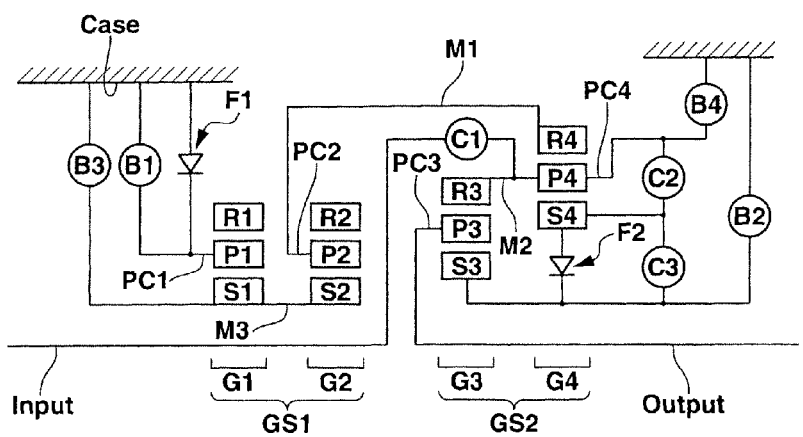
FIG.8
|  | B1 Fr/B | C1 I/C | C2 D/C | C3 H&LR/C | B2 LOW/B | B3 2346/B | B4 R/B | F1 | F2 |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  |  | ○ |  |
| Rev. | ○ |  |  | ○ |  |  | ○ |  |  |

| No. | CURRENT SHIFT | SUCCEEDING SHIFT | CL2 ELEMENT | CURRENT SHIFT DISENGAGEMENT ELEMENT | SUCCEEDING SHIFT DISENGAGEMENT ELEMENT |
|---|---|---|---|---|---|
| 1 | 7-6 | 6-5 | I/C | Fr/B | 2346/B |
| 2 | 7-6 | 6-4 | I/C | Fr/B | I/C |
| 3 | 6-5 | 5-4 | I/C | 2346/B | I/C |
| 4 | 6-4 | 4-3 | I/C | I/C | H&LR/C |
| 5 | 5-4 | 4-3 | H&LR/C | I/C | H&LR/C |
| 6 | 5-4 | 4-2 | H&LR/C | I/C | D/C |
| 7 | 4-3 | 3-2 | H&LR/C | H&LR/C | D/C |
| 8 | 4-2 | 2-1 | H&LR/C | D/C | 2346/B |
| 9 | 3-2 | 2-1 | D/C | D/C | 2346/B |
| 10 | 3-2 | 2-1 | LOW/B | D/C | 2346/B |

CONTROL APPARATUS FOR HYBRID VEHICLE

BACKGROUND OF THE INVENTION

The present invention relates to a control apparatus for a hybrid vehicle which has an engagement element between a motor and driving wheels.

As a technique for controlling the hybrid vehicle, for example, it is disclosed in Japanese Patent Provisional Publication No. 2009-214640 (hereinafter is referred to as "JP2009-214640"). In JP2009-214640, a motor/generator is provided between an engine and a multi-range automatic transmission. Further, a first clutch to transmit/cut a driving force between the engine and the motor/generator and a second clutch to transmit/cut a driving force between the motor/generator and the automatic transmission are provided on a driveline. JP2009-214640 discloses a technique that suppresses a shift shock by performing a slip control of the second clutch when a shift operation is carried out without an engine start.

SUMMARY OF THE INVENTION

In JP2009-214640, however, in a case where the shift is performed successively, for example, from $5^{th}$ to $4^{th}$ and $3^{rd}$, if the slip control of the second clutch is merely stopped on the basis of completion of a first shift (i.e. in this case, the shift of $5^{th} \rightarrow 4^{th}$), an input torque to the automatic transmission varies, then the shift shock might occur.

For this problem, it is therefore an object of the present invention to provide a control apparatus for the hybrid vehicle which is capable of preventing the shift shock even when successive shift is performed.

According to one aspect of the present invention, a control apparatus of a hybrid vehicle, the hybrid vehicle having an engine, a motor, an automatic transmission performing a shift by engaging or disengaging a plurality of engagement elements, a first clutch arranged between the engine and the motor for transmitting/cutting a driving force between the engine and the motor and a second clutch arranged between the motor and driving wheels for transmitting/cutting a driving force from the motor to the driving wheels, the control apparatus comprises: a slip control section that controls the second clutch to a slip state during the shift of the automatic transmission, and in a case of a successive shift in which a current shift and a succeeding shift are successively performed, the slip control section gradually increases an engagement pressure of the second clutch when changing the slip state of the second clutch to a fully engaged state after the current shift is completed and before the succeeding shift is completed.

According to another aspect of the invention, a method for controlling a hybrid vehicle, the hybrid vehicle provided with an engine, a motor, an automatic transmission performing a shift by engaging or disengaging a plurality of engagement elements, a first clutch arranged between the engine and the motor for transmitting/cutting a driving force between the engine and the motor and a second clutch arranged between the motor and driving wheels for transmitting/cutting a driving force from the motor to the driving wheels, the method comprises: controlling the second clutch to a slip state during the shift of the automatic transmission; and in a case of a successive shift in which a current shift and a succeeding shift are successively performed, gradually increasing an engagement pressure of the second clutch when changing the slip state of the second clutch to a fully engaged state after the current shift is completed and before the succeeding shift is completed.

The other objects and features of this invention will become understood from the following description with reference to the accompanying drawings.

BRIEF DESCRIPTION OF THE DRAWINGS

FIG. 6 is a shift map of an automatic transmission of the embodiment 1.

FIG. 7 is a block diagram showing a basic configuration of the automatic transmission of the embodiment 1.

FIG. 8 is an engagement operation table of the automatic transmission of the embodiment 1.

DETAILED DESCRIPTION OF THE INVENTION

According to the present invention, an abrupt change from a slip state to a fully engaged state is prevented, the shift shock can therefore be suppressed. Embodiments of the present invention will now be explained below with reference to the drawings.

Embodiment 1

Drive System

Figure 1:
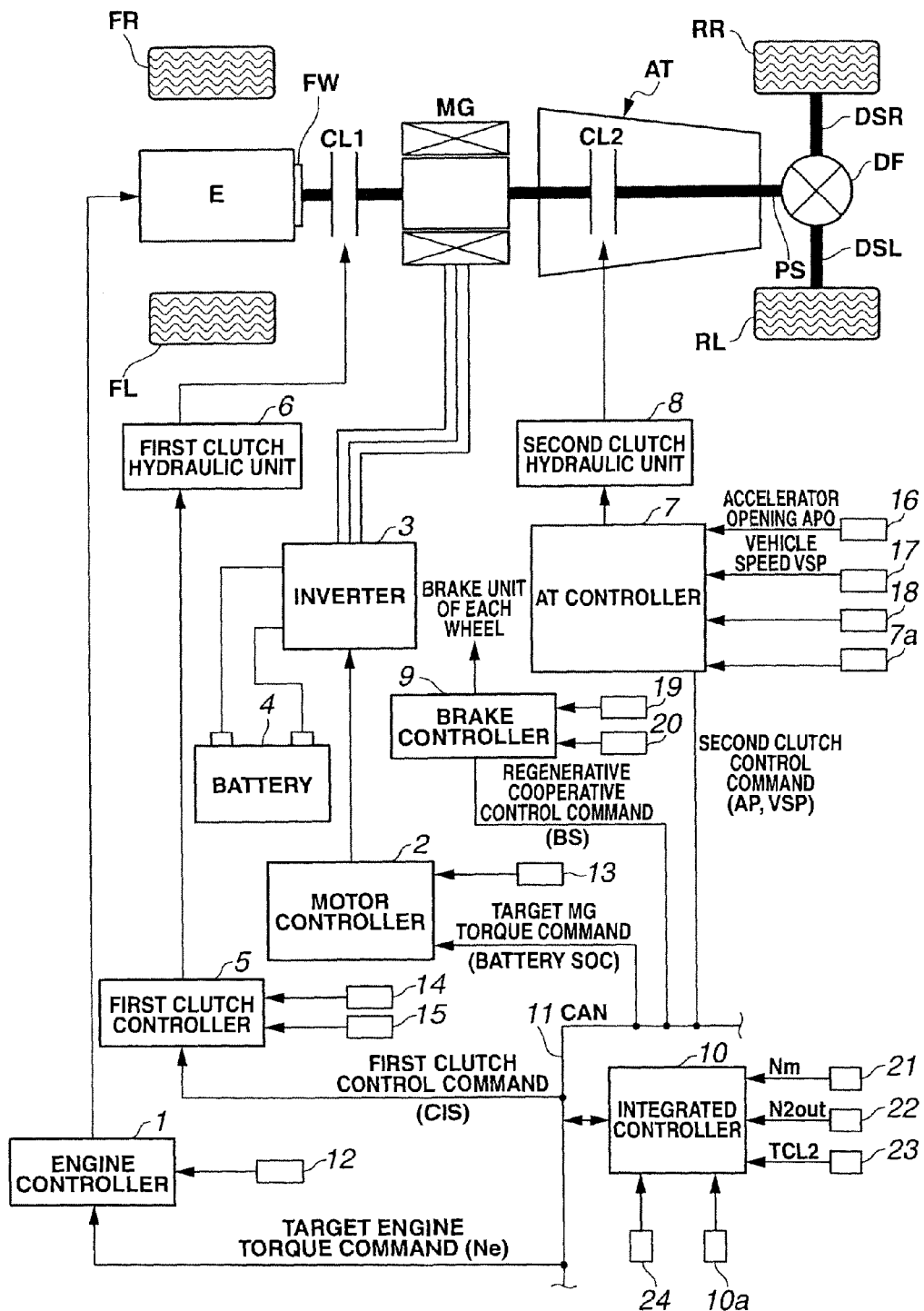
FIG. 1 is a system block diagram showing a rear-wheel-drive hybrid vehicle employing a vehicle start engine starting control apparatus of an embodiment 1.

First, a drive system of a hybrid vehicle will be explained. FIG. 1 is a whole system block diagram showing a rear-wheel-drive hybrid vehicle employing an engine starting control apparatus of the embodiment 1.

The drive system of the hybrid vehicle in the embodiment 1 has an engine E, a flywheel FW, a first clutch CL1, a motor/generator MG, a second clutch CL2, an automatic transmission AT, a propeller shaft PS, a differential gear DF, a left drive shaft DSL, a right drive shaft DSR, a rear left wheel RL (driving wheel), and a rear right wheel RR (driving wheel). Needless to say, FL is a front left wheel, and FR is a front right wheel.

The engine E is, for instance, a gasoline engine or a diesel engine, and a valve opening of throttle valve etc. is controlled on the basis of a control command from an after-mentioned engine controller 1. As shown in FIG. 1, the flywheel FW is provided at an engine output shaft.

The first clutch CL1 is a clutch that is arranged between the engine E and the motor/generator MG. Engagement/disengagement including slip-engagement and slip-disengagement, of the first clutch CL1 are controlled by a control pressure that is produced by a first clutch hydraulic unit 6 on the basis of a control command from an after-mentioned first clutch controller 5.

The motor/generator MG is a synchronous type motor/generator in which a permanent magnet is embedded in a rotor and a stator coil is wound around a stator. The motor/generator MG is controlled through the application of a three-phase alternating current that is generated by an inverter 3 on the basis of a control command from an after mentioned motor controller 2. This motor/generator MG works as an electric motor that performs a rotational drive operation by receiving a power from a battery 4 (hereinafter, this state is called a power running state). And also, in a case where the rotor is rotated by an external force, the motor/generator MG works as a generator that generates an electromotive force at both ends of the stator coil, and is able to charge the battery 4 (hereinafter, this operating state is called a regenerative state). Here, the rotor of this motor/generator MG is connected to an input shaft of the automatic transmission AT through a damper (not shown).

The second clutch CL2 is a clutch that is arranged between the motor/generator MG and the rear left and rear right wheels RL, RR. Engagement/disengagement including slip-engagement and slip-disengagement, of the second clutch CL2 are controlled by a control pressure that is produced by a second clutch hydraulic unit 8 on the basis of a control command from an after-mentioned AT controller 7.

The automatic transmission AT is a transmission that automatically changes a transmission ratio of multispeed (multistage) of, for example, forward 5 speeds and reverse 1 speed according to a vehicle speed and an accelerator opening and so on. Here, the above second clutch CL2 is not a clutch that is newly added as a special clutch. The second clutch CL2 is a frictional engagement element used as one of a plurality of frictional engagement elements which are engaged in each speed or each shift stage in the automatic transmission AT. A detailed explanation will be explained later.

An output shaft of the automatic transmission AT is connected to the rear left and rear right wheels RL, RR through the propeller shaft PS, the differential gear DF, the left drive shaft DSL and the right drive shaft DSR. Here, with regard to the first and second clutches CL1 and CL2, for example, a wet multiple disc clutch whose hydraulic flow amount and hydraulic pressure can be continuously controlled by a proportional solenoid is used.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only the power of the motor/generator MG as the power source. In the EV drive mode, an EV micro slip control in which the vehicle travels while slightly slipping the second clutch CL2 is performed. The EV micro slip control is a control for suppressing variation of torque upon change of state of the second clutch CL2 from a fully engaged state to a slip state when slip-controlling the second clutch CL2 in a case of an engine start requirement or a shift requirement. The EV micro slip control is basically carried out when the EV drive mode is selected.

A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC (Wet Start Clutch) drive mode) in which the first clutch CL1 is in the engaged state and the second clutch CL2 is slip-controlled then the vehicle travels while including the engine E as the power source.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

At a constant speed drive and an acceleration drive, the motor/generator MG works as the generator by using the power of the engine E. At a deceleration drive, by receiving a regenerative brake energy, the motor/generator MG generates the power, and this power is used to charge the battery 4.

Furthermore, as another mode, the hybrid drive system has a power generation mode in which the motor/generator MG works as the generator at the vehicle stop by using the power of the engine E.

[Control System]

Next, a control system of the hybrid vehicle will be explained. As shown in FIG. 1, the control system of the hybrid vehicle has the engine controller 1, the motor controller 2, the inverter 3, the battery 4, the first clutch controller 5, the first clutch hydraulic unit 6, the AT controller 7, the second clutch hydraulic unit 8, a brake controller 9, and an integrated controller 10. Here, the engine controller 1, the motor controller 2, the first clutch controller 5, the AT controller 7, the brake controller 9 and the integrated controller 10 are connected with each other through a CAN communication line 11 that allows the exchange of information between them.

The engine controller 1 inputs information of an engine revolution speed (an engine rpm) from an engine rpm sensor 12. The engine controller 1 outputs a command that controls an engine operating or working point (Ne: the engine revolution speed, Te: an engine torque) to, for instance, a throttle valve actuator (not shown in the drawing) in accordance with a target engine torque command etc. from the integrated controller 10. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating or working point (Nm: a motor/generator revolution speed, Tm: a motor/generator torque) of the motor/generator MG to the inverter 3 in accordance with a target motor/generator torque command etc. from the integrated controller 10. Here, this motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs sensor information from a first clutch hydraulic pressure sensor 14 and a first clutch stroke sensor 15, and outputs a command that controls the engagement/disengagement of the first clutch CL1 to the first clutch hydraulic unit 6 in accordance with a first clutch control command from the integrated controller 10. The information of a first clutch stroke C1S is sent to the integrated controller 10 via the CAN communication line 11.

The AT controller 7 inputs information from an accelerator opening sensor 16, a vehicle speed sensor 17, a second clutch hydraulic pressure sensor 18 and an inhibitor switch 7a that outputs a signal corresponding to a shift lever position operated by a driver. The AT controller 7 outputs a command that controls the engagement/disengagement of the second clutch CL2 to the second clutch hydraulic unit 8 in an AT hydraulic pressure control valve in accordance with a second clutch control command from the integrated controller 10. The information of an accelerator opening APO, a vehicle speed VSP and the inhibitor switch 7a is sent to the integrated controller 10 via the CAN communication line 11.

The brake controller 9 inputs sensor information from a wheel speed sensor 19 that detects each wheel speed of the four wheels and a brake stroke sensor 20. In addition, for instance, when a braking force by only a regenerative braking force is insufficient for a required braking force determined by a brake stroke BS upon a brake operation by driver's brake pedal depression, the brake controller 9 performs a regenerative brake cooperative control on the basis of a regenerative cooperative control command from the integrated controller 10 so that the shortage of the braking force is compensated by a mechanical braking force (a hydraulic braking force or a motor braking force, hereinafter called a friction brake braking force).

As a brake actuator for producing the friction brake braking force, in the embodiment 1, a hydraulic unit is employed. More specifically, the hydraulic unit has an accumulator that can accumulate therein a high pressure, an electric motor for supplying the high pressure to the accumulator, a pressure increase valve that controls a communication state between a wheel cylinder of each wheel and the accumulator, a pressure decrease valve that controls a communication state between the wheel cylinder of each wheel and a reservoir, etc. Then, by controlling the pressure increase and decrease valves in accordance with allocation of the braking force for each wheel cylinder of the wheel, a brake hydraulic pressure is controlled. Here, the pressure of the wheel cylinder could be increased directly by the electric motor. Or, it is possible to employ an electric brake that produces the braking force by controlling a position (a pressing force) of a brake pad with the electric motor. These manners are not specially limited.

The integrated controller 10 is a controller that controls a consumption energy of the whole vehicle, and performs the operation in order for the hybrid vehicle to travel at a maximum efficiency. The integrated controller 10 inputs information from a motor revolution speed sensor 21 for detecting the motor revolution speed Nm, a second clutch output revolution speed sensor 22 for detecting a second clutch output revolution speed N2out, a second clutch torque sensor 23 for detecting a second clutch torque TCL2, a brake hydraulic pressure sensor 24 and a temperature sensor 10a for detecting a temperature of the second clutch CL2, also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5, and the engagement/disengagement control of the second clutch CL2 by the control command to the AT controller 7.

[Configuration of Integrated Controller]

Figure 2:
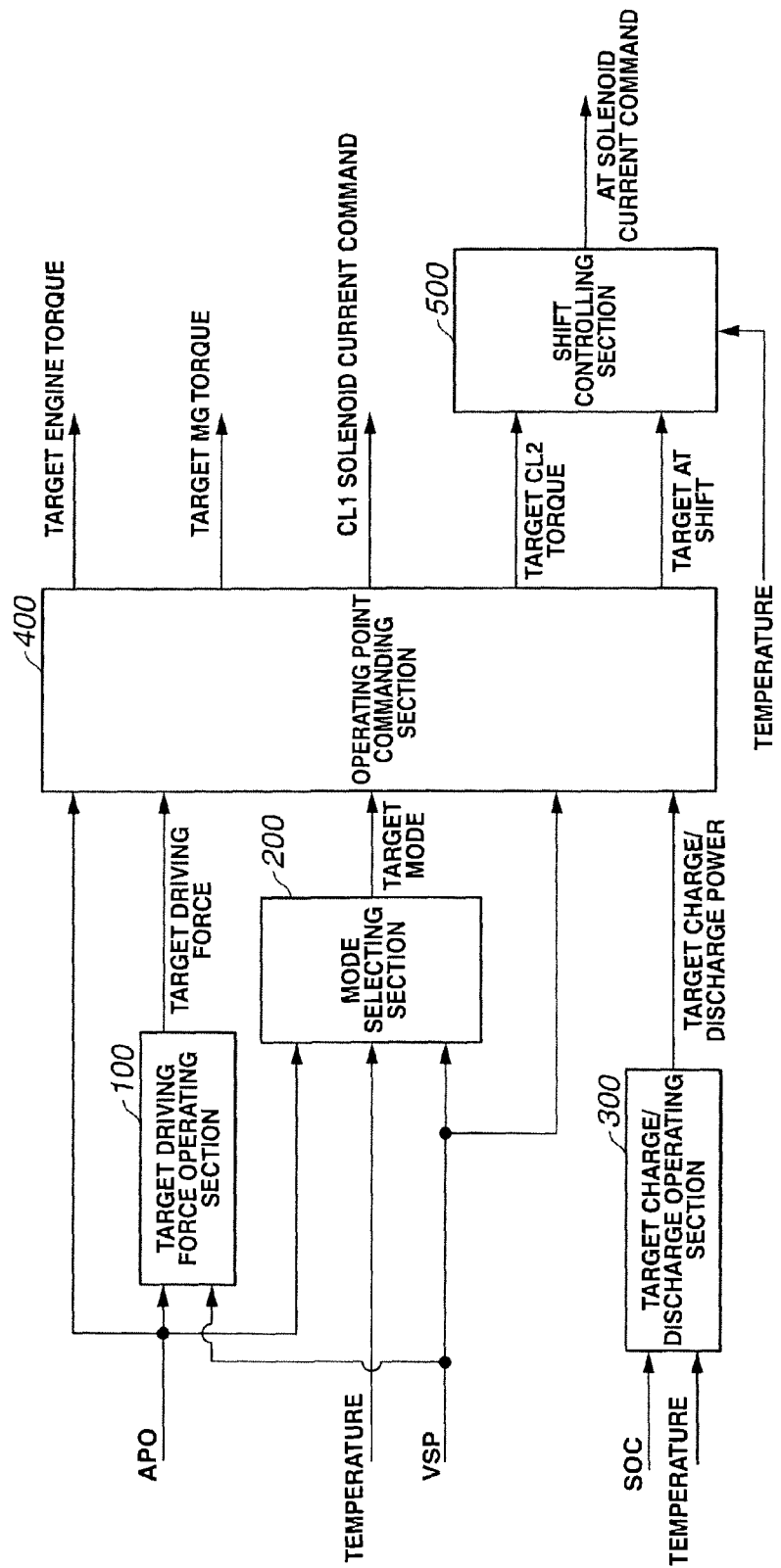
FIG. 2 is a control block diagram showing an operation process program executed in an integrated controller of the embodiment 1.

FIG. 2 is a control block diagram of the integrated controller 10. In the following description, a control executed in the integrated controller 10 of the embodiment 1 will be explained with reference to the control block diagram in FIG. 2. This operation is executed for instance at a control cycle period 10 msec in the integrated controller 10. The integrated controller 10 has a target driving force operating section 100, a mode selecting section 200, a target charge/discharge operating section 300, an operating point commanding section 400 and a speed change or shift change controlling section (simply, a shift controlling section) 500.

Figure 3:
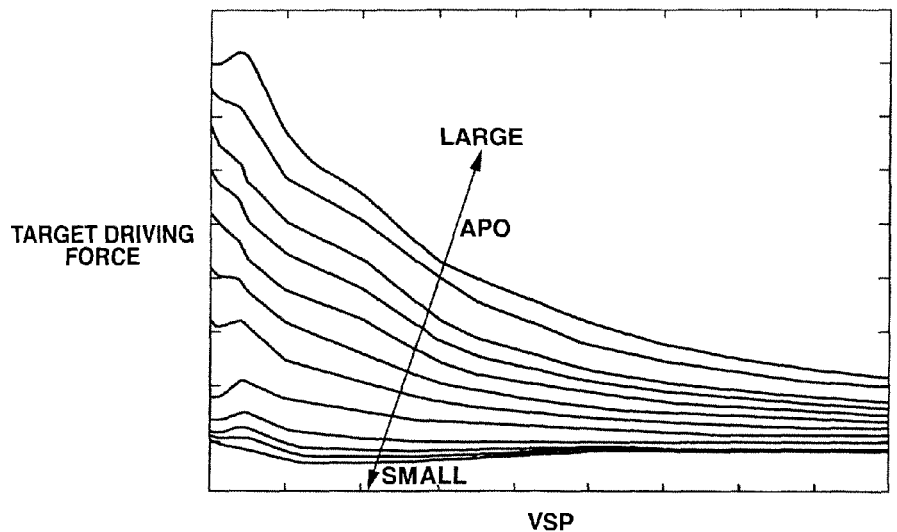
FIG. 3 is an example of a target driving force map used for calculation of a target driving force in a target driving force operating section of FIG. 2.

The target driving force operating section 100 calculates a target driving force tFo0 on the basis of the accelerator pedal opening APO and the vehicle speed VSP using a target driving force map shown in FIG. 3.

Figure 4:
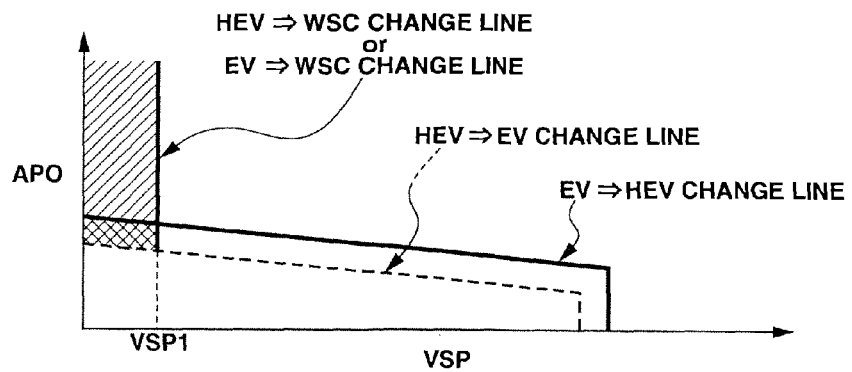
FIG. 4 is an EV-HEV selection map used for selection of a target mode in a mode selecting section of FIG. 2.

The mode selecting section 200 operates (selects) a target drive mode from the accelerator opening APO and the vehicle speed VSP using an EV-HEV selection map shown in FIG. 4. However, if the battery SOC is lower than or equal to a predetermined value, the target drive mode is set to the HEV mode compulsorily or forcibly. In the EV-HEV selection map, in order to output a great driving force when the vehicle speed VSP is in a low vehicle speed area and the accelerator opening APO is large, the WSC drive mode is set in the EV-HEV selection map.

A HEV→WSC change line and an EV→WSC change line are set in an area where the vehicle speed VSP is lower than a vehicle speed VSP1. Here, the vehicle speed VSP1 is a vehicle speed at which the engine rpm becomes smaller than an idle speed of the engine E when the automatic transmission AT is 1$^{st}$ speed. In the EV-HEV selection map, a hatch pattern area (oblique line pattern area) is an area where the mode is changed from the HEV drive mode to the WSC drive mode. A double hatch pattern area (cross line pattern area) is an area where the mode is changed from WSC drive mode to the EV drive mode.

Further, with regard to a HEV→EV change line by which the drive mode is changed from the HEV drive mode to the EV drive mode, it is set so that the mode change is permitted only when the vehicle speed VSP becomes lower than the vehicle speed VSP1 whose engine rpm is smaller than the idle rotation speed of the engine E during 1$^{st}$ speed of the automatic transmission AT. In other words, the control is carried out so that, when the drive mode is the EV drive mode, the EV drive mode is maintained to the utmost, then, once the drive mode is changed to the HEV drive mode, the HEV drive mode is maintained to the utmost.

Figure 5:
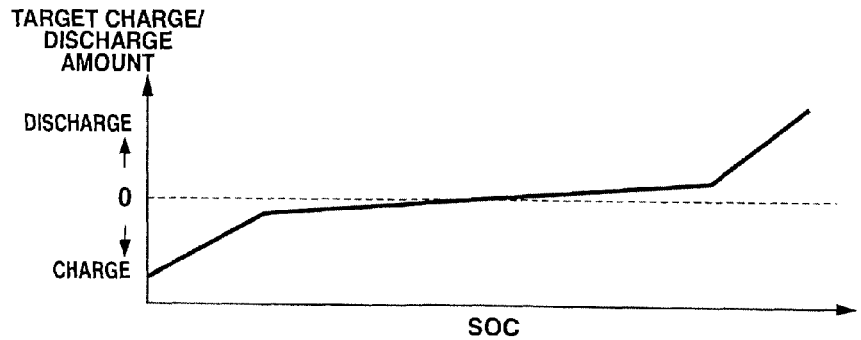
FIG. 5 is an example of a target charge/discharge amount map used for calculation of a target charge/discharge power in a target charge/discharge operating section of FIG. 2.

The target charge/discharge operating section 300 calculates a target charge/discharge power tP from the battery SOC using a target charge/discharge amount map shown in FIG. 5.

The operating point commanding section 400 calculates transitional target engine torque, target motor/generator torque, target second clutch engagement capacity, target shift of the automatic transmission AT and first clutch solenoid current command, on the basis of the accelerator pedal opening APO, the target driving force tFo0, the target mode, the vehicle speed VSP and the target charge/discharge power tP, as attainment targets of these operating points. Further, the operating point commanding section 400 is provided with an engine start controlling section that starts the engine E when changing the mode from the EV drive mode to the HEV drive mode.

The shift controlling section 500 controls drive of a solenoid valve in the automatic transmission AT to attain the target second clutch engagement capacity and the target shift stage along a shift schedule set in a shift map of FIG. 6. Here, the shift map shown in FIG. 6 is a map in which the target shift stage is preset according to the vehicle speed VSP and the accelerator pedal opening APO. In the shift map, a solid line indicates an up-shift line, a dotted line indicates a down-shift line.

[Configuration of Automatic Transmission]

FIG. 7 is a block diagram showing a power train of the automatic transmission AT employed on a driveline of the hybrid vehicle. FIG. 8 is an engagement operation table of clutch/brake in the automatic transmission AT.

In the automatic transmission AT, a first planetary gear set GS1 and a second planetary gear set GS2 are arranged respectively in a direction from an input shaft "Input" side toward an output shaft "Output" side. Further, as engagement elements, a plurality of clutches C1, C2 and C3 and a plurality of brakes B1, B2, B3 and B4 are arranged. In addition, a plurality of one-way clutches F1 and F2 are provided.

A first planetary gear G1 is a single pinion type planetary gear that has a first sun gear S1, a first ring gear R1, a first pinion P1 engaging with both gears S1 and R1 and a first carrier PC1 carrying or supporting the first pinion P1. A second planetary gear G2 is a single pinion type planetary gear that has a second sun gear S2, a second ring gear R2, a second pinion P2 engaging with both gears S2 and R2 and a second carrier PC2 carrying or supporting the second pinion P2. A third planetary gear G3 is a single pinion type planetary gear that has a third sun gear S3, a third ring gear R3, a third pinion P3 engaging with both gears S3 and R3 and a third carrier PC3 carrying or supporting the third pinion P3. A fourth planetary gear G4 is a single pinion type planetary gear that has a fourth sun gear S4, a fourth ring gear R4, a fourth pinion P4 engaging with both gears S4 and R4 and a fourth carrier PC4 carrying or supporting the fourth pinion P4.

The input shaft Input is connected to the second ring gear R2, then a rotation driving force from the engine E is inputted through a torque converter TC etc. The output shaft Output is connected to the third carrier PC3, then an output rotation driving force is transmitted to the driving wheels through a final gear etc.

An input clutch C1 (I/C) is a clutch that selectively connects/disconnects the input shaft Input and a second connecting member M2. A direct clutch C2 (D/C) is a clutch that selectively connects/disconnects the fourth sun gear S4 and the fourth carrier PC4.

H&LR clutch C3 (H&LR/C) is a clutch that selectively connects/disconnects the third sun gear S3 and the fourth sun gear S4. Between the third sun gear S3 and the fourth sun gear S4, the second one-way clutch F2 is arranged. With this arrangement, when the H&LR clutch C3 is disengaged and a rotation speed of the fourth sun gear S4 is greater than that of the third sun gear S3, the third sun gear S3 and the fourth sun gear S4 independently generate their respective rotation speeds. In this way, the automatic transmission AT has the configuration in which the third planetary gear G3 and the fourth planetary gear G4 are connected through the second connecting member M2, then the planetary gears independently attain their respective gear ratios (or their respective transmission ratios).

A front brake B1 (Fr/B) is a brake that selectively stops a rotation of the first carrier PC1. The first one-way clutch F1 is arranged parallel to the front brake B1. A low brake B2 (LOW/B) is a brake that selectively stops a rotation of the third sun gear S3. A 2346 brake B3 (2346B) is a brake that selectively stops a rotation of a third connecting member M3 that connects the first sun gear S1 and the second sun gear S2. A reverse brake B4 (R/B) is a brake that selectively stops a rotation of the fourth carrier PC4.

The automatic transmission AT has such shift gear mechanism or arrangement explained above. By changing an engagement state of each engagement element as shown in the engagement table of FIG. 8, a desired shift stage can be realized. FIG. 8 is the engagement table that shows the engagement state of each engagement element for each shift stage. "◯" indicates that the engagement element is in the engaged state. "(◯)" indicates that when a range position at which an engine brake works is selected, the engagement element is in the engaged state.

That is, in a case of $1^{st}$ speed, only the low brake B2 (LOW/B) becomes the engaged state. With this engagement, the first one-way clutch F1 and the second one-way clutch F2 are respectively engaged. In a case of $2^{nd}$ speed, the low brake B2 (LOW/B) and the 2346 brake B3 (2346B) become the engaged state, then the second one-way clutch F2 is engaged. In a case of $3^{rd}$ speed, the low brake B2 (LOW/B), the 2346 brake B3 (2346B) and the direct clutch C2 (D/C) become the engaged state. In this case, neither the first one-way clutch F1 nor the second one-way clutch F2 is engaged. In a case of $4^{th}$ speed, the 2346 brake B3 (2346B), the direct clutch C2 (D/C) and the H&LR clutch C3 (H&LR/C) become the engaged state. In a case of $5^{th}$ speed, the input clutch C1 (I/C), the direct clutch C2 (D/C) and the H&LR clutch C3 (H&LR/C) become the engaged state. In a case of $6^{th}$ speed, the 2346 brake B3 (2346B), the input clutch C1 (I/C) and the H&LR clutch C3 (H&LR/C) become the engaged state. In a case of $7^{th}$ speed, the front brake B1 (Fr/B), the input clutch C1 (I/C) and the H&LR clutch C3 (H&LR/C) become the engaged state, and the first one-way clutch F1 is engaged. In a case of reverse speed, the reverse brake B4 (R/B), the front brake B1 (Fr/B) and the H&LR clutch C3 (H&LR/C) become the engaged state.

Figures 9, 10:
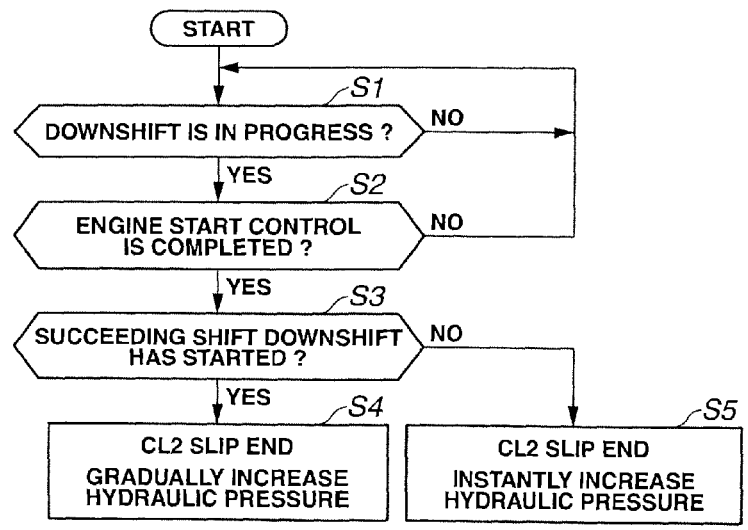
FIG. 9 is a drawing showing a relationship of each engagement element when successive shift is performed, of the embodiment 1.
FIG. 10 is a flow chart showing a second clutch engagement pressure control process of the embodiment 1.

FIG. 9 is a drawing showing a relationship of each engagement element when successive shift is performed, of the embodiment 1. In FIG. 9, each box of "CURRENT SHIFT" indicates a first shift or a former shift when a shift command is outputted. Each box of "SUCCEEDING SHIFT" indicates a second shift or a latter shift which is performed after the former shift is completed. Each box of "CL2 ELEMENT" indicates an engagement element that works as the second clutch CL2 during the successive shift. Each box of "CURRENT SHIFT DISENGAGEMENT ELEMENT" indicates an engagement element that is disengaged in the former shift (in the current shift). Each box of "SUCCEEDING SHIFT DISENGAGEMENT ELEMENT" indicates an engagement element that is disengaged in the latter shift (in the succeeding shift). In FIG. 9, ten patterns of the successive shift are listed with each pattern numbered.

In the hybrid vehicle of the embodiment 1, for instance, during the travel in the EV drive mode, the EV micro slip control is performed, and the slip state is maintained all the time. When the shift requirement arises in this state, by performing the shift control while maintaining the slip state, a shift shock is suppressed. Further, when the engine start requirement arises during the travel in the EV drive mode, the engine is started with the slip state of the second clutch CL2 maintained. Here, also when the shift requirement arises during the engine start, the shift control is performed with the slip state of the second clutch CL2 maintained. In this way, the second clutch CL2 is maintained in the slip state when performing the shift, and after the completion of the shift or after the completion of the engine start, the second clutch CL2 is brought to the fully engaged state.

As shown in FIG. 9, in the hybrid vehicle having the automatic transmission AT of the embodiment 1, the second clutch CL2 changes, as shown by the boxes of "CL2 ELE- MENT", according to the shift stage of the travelling. For example, in the cases of $6^{th}$ speed and $7^{th}$ speed, as the second clutch CL2, the input clutch C1 (I/C) is used. In the cases of $5^{th}$ speed and $4^{th}$ speed, as the second clutch CL2, the H&LR clutch C3 (H&LR/C) is used.

The successive shift patterns of Nos. 1, 6, 8 and 10 are cases where the engagement element that is disengaged in the current shift, the engagement element that is disengaged in the succeeding shift and the engagement element that works as the second clutch CL2 are different from each other. In this case, when the current shift is completed, an engagement pressure of the second clutch CL2 is gradually increased, then the second clutch CL2 is brought to the fully engaged state from the slip state. At this time, in a case of single shift in which only the current shift is carried out, when the single shift is completed then the second clutch CL2 is brought to the fully engaged state from the slip state, this state change from the slip state to the fully engaged state is performed at a greater pressure increase rate of the engagement pressure of the second clutch CL2 than a rate of the pressure increase of the second clutch CL2 performed during the successive shift.

In other words, in the case of the successive shift, during the succeeding shift after the former shift, the engagement pressure of the second clutch CL2 is gradually increased. In the case of the single shift, after the single shift, the engagement pressure of the second clutch CL2 is instantly increased. That is, after the shift is completed, an influence of inertia of the rotation element in the automatic transmission AT is small, and by fully engaging the second clutch CL2 as early as possible, the driving force from the engine E and/or the motor/generator MG is transmitted. This engagement gives rise to increase in durability of the second clutch CL2 also increase in drivability.

In contrast to this, since the succeeding shift is carried out in the case where the current shift is completed during the successive shift, a state in which the influence of inertia of the rotation element in the automatic transmission AT is not negligible continues. Further, once the shift starts, after this shift start, although the second clutch CL2 is fully engaged, suppression of the shift shock is possible, also in terms of the durability and the drivability, it is required that the second clutch CL2 is fully engaged. Here, after the succeeding shift starts after the completion of the current shift during the successive shift, if the second clutch CL2 is instantly fully engaged, there is a risk that a proper shift operation will be hindered by the variation of torque (torque change) due to the instant full engagement of the second clutch CL2. Moreover, there is a possibility that the shift shock will occur in the succeeding shift. Thus, in the case where the current shift is completed during the successive shift, in the present invention, the engagement pressure of the second clutch CL2 is gradually increased.

In FIG. 9, in a case where the engagement element that is disengaged in the current shift and the second clutch CL2 are the same, or in a case where the engagement element that is disengaged in the succeeding shift and the second clutch CL2 are the same, the control for disengaging the engagement element has priority over the slip state. More specifically, these cases are the successive shift patterns of Nos. 2 to 5, 7 and 9, and the disengagement control is given priority, and there is no increase of the engagement pressure of the second clutch CL2. A smooth shift can be then achieved.

FIG. 10 is a flow chart showing a second clutch engagement pressure control process of the embodiment 1. This control flow is a process that is executed in the case where the engagement element that is disengaged in the current shift, the engagement element that is disengaged in the succeeding shift and the engagement element that works as the second clutch CL2 are different from each other. Although the flow for the down-shift will be explained below, the flow can be applied to the up-shift. At step S1, a judgment is made as to whether or not the down-shift is in progress. If YES (the down-shift is in progress), the routine proceeds to step S2. If NO, the routine returns to the start.

At step S2, a judgment is made as to whether or not the engine start control is completed. If YES, namely that the engine start control is judged to be completed, the routine proceeds to step S3. If NO, the routine returns to the start.

At step S3, a judgment is made as to whether or not the succeeding shift down-shift has started. If YES, namely that it is judged that the succeeding shift down-shift has started, i.e. in the case of the successive shift, the routine proceeds to step S4. If NO, i.e. in the case of the single shift, the routine proceeds to step S5.

At step S4, the engagement pressure of the second clutch CL2 is gradually increased, namely that the engagement pressure is increased at a predetermined gradual increase rate, then the second clutch CL2 is brought to the fully engaged state.

At step S5, the engagement pressure of the second clutch CL2 is instantly increased, namely that the engagement pressure is increased rapidly or at once, then the second clutch CL2 is brought to the fully engaged state.

Figure 11:
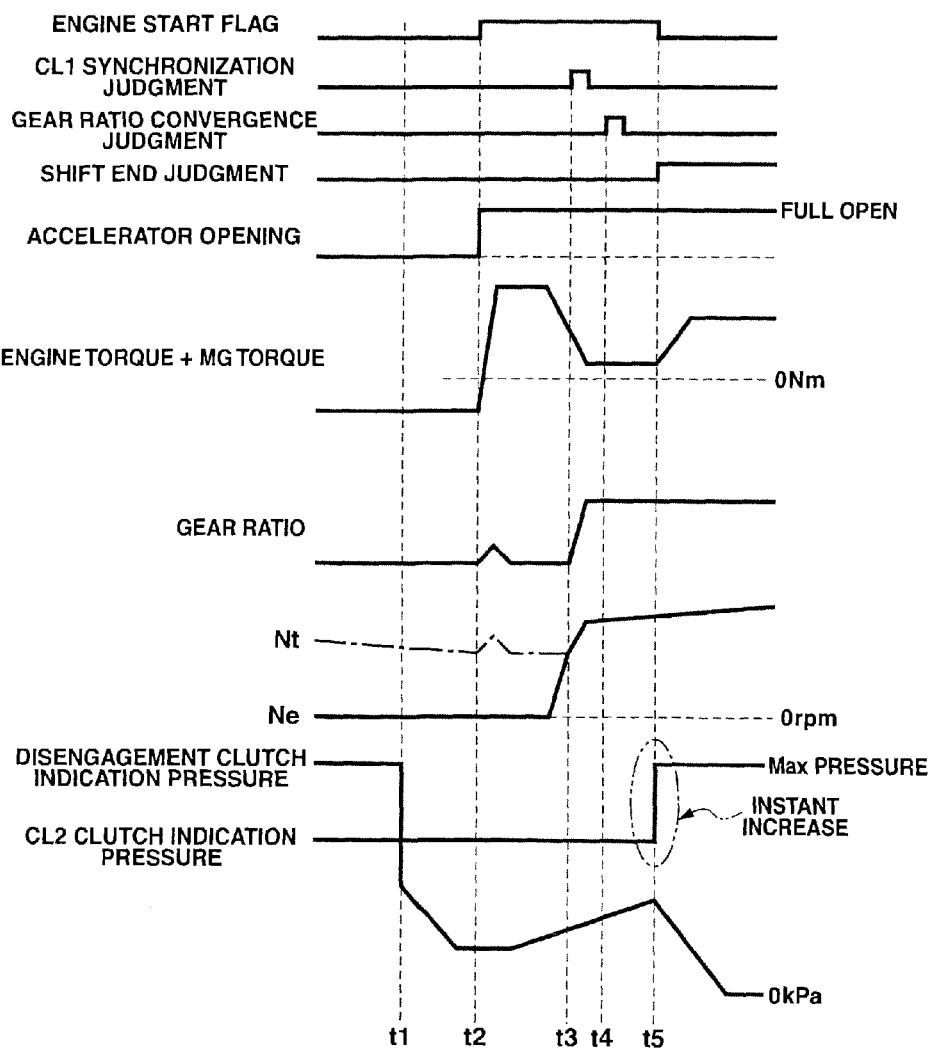
FIG. 11 is a time chart showing a shift state in a case of single shift of the embodiment 1.

FIG. 11 is a time chart showing a shift state in the case of the single shift of the embodiment 1. The time chart shows that, in an initial state, in the EV drive mode in which the engine E is in the stop state, a down-shift command is outputted in a deceleration state in which a coast torque is generated by the motor/generator MG. And after that, an accelerator pedal is depressed, then the engine start requirement is outputted. Here, in the EV drive mode, the EV micro slip control is performed, and a transmission torque capacity of the second clutch CL2 is set to such capacity that a slight slip occurs.

At time t1, when the down-shift command is outputted, a disengagement clutch indication pressure that is an engagement pressure of the engagement element that is disengaged in the current shift instantly decreases. At this time, the second clutch CL2 is being slip-controlled by the EV micro slip control.

At time t2, when the driver depresses the accelerator pedal and a driver requirement torque becomes great, since the engine start requirement is outputted, an engagement control of the first clutch CL1 is performed, and by this first clutch engagement, the engine start is carried out by the motor/generator MG. Therefore, the motor/generator MG changes in a torque state from a state in which the motor/generator MG outputs a regenerative torque to a state in which the motor/generator MG outputs a drive torque. At this time, the torque is outputted with a torque required to start the engine E added.

At time t3, when the engine revolution speed increases and a slip amount of the first clutch CL1 becomes substantially zero, a CL1 synchronization judgment flag is ON, and an input torque is outputted as a total torque of the engine torque and the motor/generator torque. Here, in terms of suppression of engine racing or engine rpm surge, a control that temporarily suppresses the torque by the motor/generator MG is carried out. As can be seen in FIG. 11, the disengagement clutch indication pressure temporarily gradually increases at a gradient according to the input torque (the engine torque+ the motor/generator torque).

At time t4, when an inertia phase ends and it is judged that an actual gear ratio converges to an after-shift gear ratio, a gear ratio convergence judgment flag is ON.

At time t5, when it is judged that the shift operation is completely ended, a shift operation end judgment flag is ON, and the engagement pressure of the second clutch CL2 is instantly increased. With this operation, a smooth torque transmission can be secured.

Figure 12:
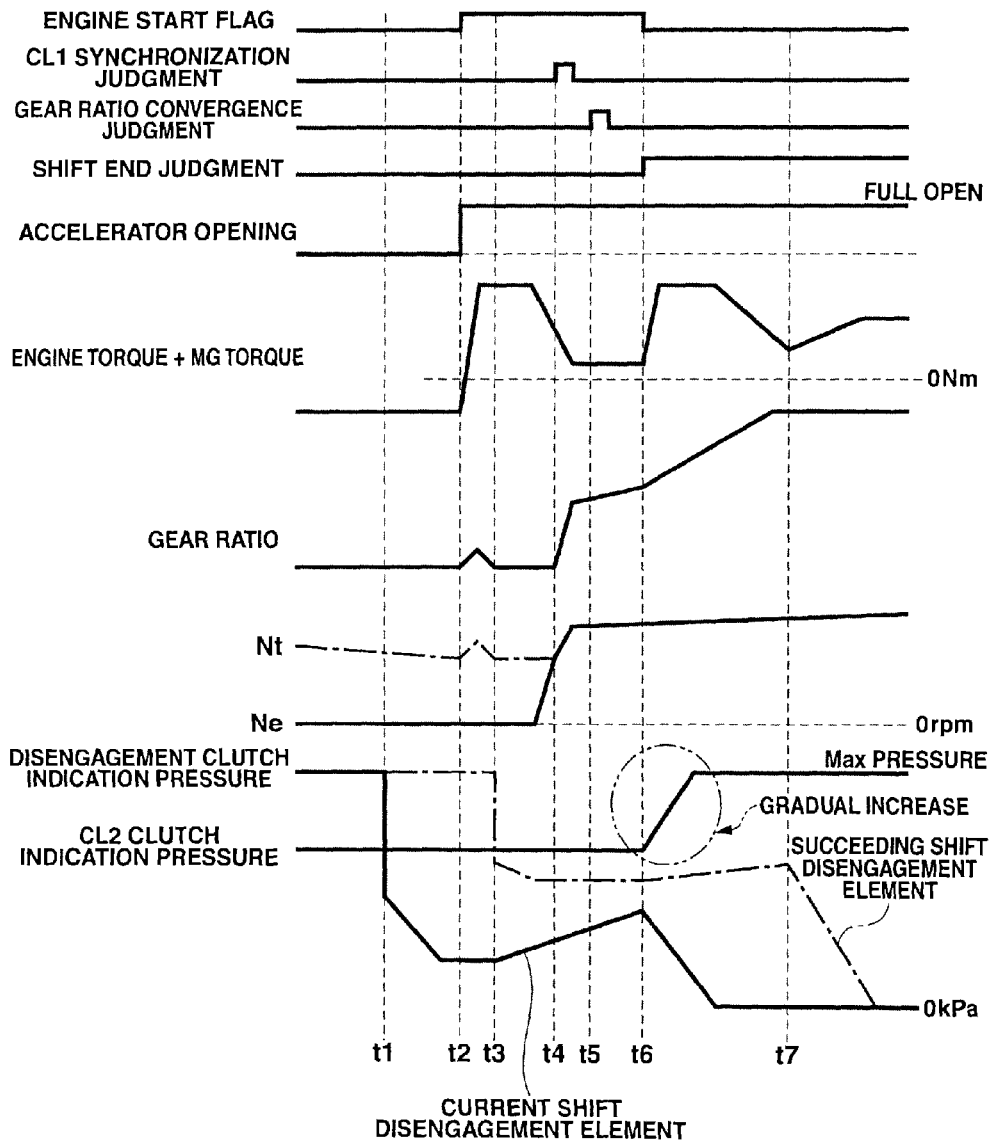
FIG. 12 is a time chart showing a shift state in a case of the successive shift of the embodiment 1.

FIG. 12 is a time chart showing a shift state in the case of the successive shift of the embodiment 1. The time chart shows that, in an initial state, in the EV drive mode in which the engine E is in the stop state, a successive down-shift command is outputted in the deceleration state in which the coast torque is generated by the motor/generator MG. And during the current down-shift, the accelerator pedal is depressed, then the engine start requirement is outputted. Here, a former down-shift command of the successive down-shift is called a first down-shift command, and a latter down-shift command is called a second down-shift command.

At time t1, when the first down-shift command is outputted, a disengagement clutch indication pressure of the engagement pressure of the current shift disengagement element instantly decreases. At this time, the second clutch CL2 is being slip-controlled by the EV micro slip control.

At time t2, during the output of the first down-shift command, when the driver depresses the accelerator pedal and the driver requirement torque becomes great, since the engine start requirement is outputted, the engagement control of the first clutch CL1 is performed, and by this first clutch engagement, the engine start is carried out by the motor/generator MG. Therefore, the motor/generator MG changes in the torque state from the state in which the motor/generator MG outputs the regenerative torque to the state in which the motor/generator MG outputs the drive torque. At this time, the torque is outputted with the torque required to start the engine E added.

At time t3, a disengagement clutch indication pressure of the engagement pressure of the succeeding shift disengagement element that is disengaged on the basis of the second down-shift command, is decreased to a limit state in which the disengagement element slips, to stand by for the succeeding shift.

At time t4, when the engine revolution speed increases by being pulled up by the motor/generator MG and the slip amount of the first clutch CL1 becomes substantially zero, a CL1 synchronization judgment flag is ON, and the input torque is outputted as the total torque of the engine torque and the motor/generator torque. Here, in terms of suppression of engine racing or engine rpm surge, the control that temporarily suppresses the torque by the motor/generator MG is carried out. As can be seen in FIG. 12, the disengagement clutch indication pressure temporarily gradually increases at a gradient according to the input torque (the engine torque+ the motor/generator torque). At this time, the gear ratio starts changing on the basis of the first down-shift command.

At time t5, when it is judged that the gear ratio converges to a gear ratio to be achieved by the first down-shift command, a gear ratio convergence judgment flag is ON.

At time t6, when it is judged that the shift operation by the first down-shift command is completely ended, a shift operation end judgment flag is ON, and the engagement pressure of the second clutch CL2 is gradually increased. In other words, the engagement pressure of the second clutch CL2 is increased at a more gradual or gentler gradient than the case of the end of the single shift. With this operation, the shift shock due to the engagement of the second clutch CL2 is suppressed. Then, the shift operation by the second down-shift command is started. At this time, in order to progress the downshift, the total torque of the engine torque and the motor/generator torque is increased, and a rotation synchronization is performed.

At time t7, when it is judged that the gear ratio converges by the shift according to the second down-shift command, the engagement pressure of the succeeding shift disengagement element is decreased, then the shift operation is completed.

Next, effects of the present invention will be explained. The control apparatus of the hybrid vehicle in the embodiment 1 provides the following effects.

(1) The control apparatus of the hybrid vehicle, the hybrid vehicle having the engine E, the motor MG, the automatic transmission AT performing a shift by engaging or disengaging a plurality of engagement elements, the first clutch CL1 arranged between the engine E and the motor MG for transmitting/cutting the driving force between the engine E and the motor MG and the second clutch CL2 arranged between the motor MG and driving wheels RL, RR for transmitting/cutting the driving force from the motor MG to the driving wheels RL, RR, the control apparatus has: the slip control section (the operating point commanding section) 400 that controls the second clutch CL2 to the slip state during the shift of the automatic transmission AT, and in the case of the successive shift in which the current shift and the succeeding shift are successively performed, the slip control section (the operating point commanding section) 400 gradually increases the engagement pressure of the second clutch CL2 when changing the slip state of the second clutch CL2 to the fully engaged state after the current shift is completed and before the succeeding shift is completed.

That is, when ending the slip control of the second clutch CL2 during the successive shift, if the second clutch CL2 is fully engaged instantly or immediately just after the current shift is completed, there is a risk that the shift shock will occur. In contrast to this, by gradually increasing the engagement pressure of the second clutch CL2, the abrupt change from the slip state to the fully engaged state is prevented, the shift shock can therefore be suppressed.

(2) In the case where the engagement element that is disengaged in the current shift, the engagement element that is disengaged in the succeeding shift and the engagement element that works as the second clutch CL2 are different from each other, the slip control section (the operating point commanding section) 400 gradually increases the engagement pressure of the second clutch CL2 and changes the slip state of the second clutch CL2 to the fully engaged state. And in the case where the engagement element that is disengaged in the current shift and the second clutch CL2 are the same, or in the case where the engagement element that is disengaged in the succeeding shift and the second clutch CL2 are the same, the control for disengaging the engagement element has priority over the slip state.

Therefore, when performing the successive shift, since the second clutch CL2 is disengaged without being engaged before the succeeding shift starts, the successive shift can be properly performed.

(3) In the case of the single shift in which only the current shift is carried out, when changing the slip state of the second clutch CL2 to the fully engaged state after the single shift is completed, the slip control section (the operating point commanding section) 400 increases the engagement pressure of the second clutch CL2 at the greater pressure increase rate of the engagement pressure of the second clutch CL2 than the rate of the pressure increase of the second clutch CL2 performed during the successive shift.

That is, by setting the pressure increase rate of the second clutch CL2 after the completion of the single shift to be higher than the pressure increase rate of the engagement pressure of the second clutch CL2 during the successive shift, the second clutch CL2 can be fully engaged early or immediately after the single shift is completed. The driving force of the drive source is thus efficiently transmitted to the driving wheels, thereby increasing the drivability.

Although the control apparatus of the hybrid vehicle according to the present invention has been explained on the basis of the embodiment 1, the present invention is not limited to the embodiment 1. For instance, in the embodiment 1, as the second clutch CL2, the frictional engagement arranged in the automatic transmission AT is used. However, the second clutch CL2 could be provided as a different element from the frictional engagement element of the automatic transmission AT, and a clutch used specifically for the second clutch CL2 is newly added between the input shaft "Input" of the automatic transmission AT and the motor/generator MG. In this case, when performing the successive shift, since a command of the disengagement during the succeeding shift does not come after the former shift is completed, the engagement pressure is gradually increased.

The entire contents of Japanese Patent Application No. 2011-021673 filed on Feb. 3, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus of a hybrid vehicle, the hybrid vehicle having an engine, a motor, an automatic transmission performing a shift by engaging or disengaging a plurality of engagement elements, a first clutch arranged between the engine and the motor for transmitting/cutting a driving force between the engine and the motor and a second clutch arranged between the motor and driving wheels for transmitting/cutting a driving force from the motor to the driving wheels, the control apparatus comprising:
   a slip control section that controls the second clutch to a slip state during the shift of the automatic transmission, and
   in a case of a successive shift in which a current shift and a succeeding shift are successively performed, the slip control section gradually increasing an engagement pressure of the second clutch when changing the slip state of the second clutch to a fully engaged state after the current shift is completed and before the succeeding shift is completed.

2. The control apparatus of the hybrid vehicle as claimed in claim 1, wherein:
   in a case where an engagement element that is disengaged in the current shift, an engagement element that is disengaged in the succeeding shift and an engagement element that works as the second clutch are different from each other, the slip control section gradually increases the engagement pressure of the second clutch and changes the slip state of the second clutch to the fully engaged state, and
   in a case where the engagement element that is disengaged in the current shift and the second clutch are the same, or in a case where the engagement element that is disengaged in the succeeding shift and the second clutch are the same, a control for disengaging the engagement element has priority over the slip state.

3. The control apparatus of the hybrid vehicle as claimed in claim 1, wherein:
   in a case of a single shift in which only the current shift is carried out, when changing the slip state of the second clutch to the fully engaged state after the single shift is completed, the slip control section increases the engagement pressure of the second clutch at a greater pressure increase rate of the engagement pressure of the second clutch than a rate of the pressure increase of the second clutch performed during the successive shift.

4. A method for controlling a hybrid vehicle, the hybrid vehicle provided with an engine, a motor, an automatic transmission performing a shift by engaging or disengaging a plurality of engagement elements, a first clutch arranged between the engine and the motor for transmitting/cutting a driving force between the engine and the motor and a second clutch arranged between the motor and driving wheels for transmitting/cutting a driving force from the motor to the driving wheels, the method comprising:
   controlling the second clutch to a slip state during the shift of the automatic transmission; and
   in a case of a successive shift in which a current shift and a succeeding shift are successively performed, gradually increasing an engagement pressure of the second clutch when changing the slip state of the second clutch to a fully engaged state after the current shift is completed and before the succeeding shift is completed.

* * * * *